United States Patent
Schmid et al.

(10) Patent No.: US 11,573,349 B2
(45) Date of Patent: Feb. 7, 2023

(54) BOREHOLE COMPENSATION DURING PULSED-NEUTRON POROSITY LOGGING

(71) Applicant: Weatherford Technology Holdings, LLC, Houston, TX (US)

(72) Inventors: Gregory Schmid, Sugar Land, TX (US); Richard Pemper, Sugar Land, TX (US); Darrell Dolliver, Spring, TX (US)

(73) Assignee: Weatherford Technology Holdings, LLC, Houston, TX (US)

(*) Notice: Subject to any disclaimer, the term of this patent is extended or adjusted under 35 U.S.C. 154(b) by 77 days.

(21) Appl. No.: 17/334,410

(22) Filed: May 28, 2021

(65) Prior Publication Data

US 2021/0293989 A1    Sep. 23, 2021

Related U.S. Application Data

(63) Continuation of application No. 16/584,318, filed on Sep. 26, 2019, now Pat. No. 11,048,015.

(60) Provisional application No. 62/832,061, filed on Apr. 10, 2019.

(51) Int. Cl.
*G01V 5/10* (2006.01)
*G01V 5/04* (2006.01)

(52) U.S. Cl.
CPC ............ *G01V 5/102* (2013.01); *G01V 5/045* (2013.01)

(58) Field of Classification Search
CPC .......... G01V 5/102; G01V 5/105; G01V 5/10; G01V 5/108; G01V 5/045; G01V 2210/72; G01V 3/38; G01V 5/0025
See application file for complete search history.

(56) References Cited

U.S. PATENT DOCUMENTS

| | | |
|---|---|---|
| 5,235,185 A | 8/1993 | Albats et al. |
| 5,530,243 A | 6/1996 | Mathis |
| 6,207,953 B1 | 3/2001 | Wilson |
| 7,999,220 B2 | 8/2011 | Odom |
| 8,129,673 B2 | 3/2012 | Vaeth et al. |
| 9,897,719 B2 | 2/2018 | Stephenson et al. |
| 9,995,842 B2 | 6/2018 | Zhou |
| 10,001,582 B2 | 6/2018 | Zhou |

FOREIGN PATENT DOCUMENTS

WO    2010/135618    11/2010

*Primary Examiner* — David P Porta
*Assistant Examiner* — Fani Polyzos Boosalis
(74) *Attorney, Agent, or Firm* — Lewis & Reese, PLLC

(57) ABSTRACT

Methods, tools, and systems for determining porosity in an earth formation are disclosed. Neutrons are emitted into the formation to induce inelastic scattering gamma rays and thermal capture gamma rays in the formation. The induced gamma rays are detected at a proximal gamma detector and a far gamma detector, which are spaced at different axial distances from the neutron source. A measured proximal-to-far inelastic ratio (a ratio of inelastic scattering gammas detected at the proximal and far detector) and a proximal-to-far thermal capture ratio (a ratio of thermal capture gammas detected at the proximal and far detector) are determined and used to calculate the formation porosity. Techniques are disclosed for removing borehole and casing configuration effects from the measured proximal-to-far thermal capture ratio, leaving only porosity dependence.

20 Claims, 11 Drawing Sheets

BOREHOLE COMPENSATION DURING PULSED-NEUTRON POROSITY LOGGING

CROSS REFERENCE TO RELATED APPLICATIONS

This application is a continuation of U.S. Non-Provisional application Ser. No. 16/584,318, filed Sep. 26, 2019, which is a Non-Provisional of U.S. Provisional Application Ser. No. 62/832,061, filed Apr. 10, 2019. Both of these applications are incorporated herein by reference, and priority is claimed to both.

FIELD OF THE INVENTION

The present application relates to logging of boreholes in oil and gas operations, and more particularly, to pulsed-neutron porosity logging.

INTRODUCTION

Oil and gas wells can extend thousands of feet below the earth's surface and can traverse many geological formations. Such wells can include sections that are essentially vertical, segments that are essentially horizontal, and transitions between the two. Because of the enormous costs involved in drilling and completing oil and gas wells, it is imperative that the wells meet expectations in terms of hydrocarbon production.

Oil and gas well service providers use a variety of measurements to determine if wells are producing to their potential, if they are maintaining their integrity, and if interventions are needed to improve production or to otherwise repair or rejuvenate aging wells. Pulsed neutron measurements are one type of measurement available to well service providers. Pulsed neutron measurements can be used to identify oil and gas in geological formations, evaluate hydrocarbon production, characterize the porosity of formations, and determine the condition of certain features of a well, such as gravel pack density.

A well service provider uses a tool called a pulsed neutron logging tool to perform pulsed neutron measurements. FIG. 1 illustrates a section of a wellbore 100 extending into a formation 101. The illustrated wellbore 100 is stabilized by a casing 103 held against the formation 101 by cement 104. The cylindrical volume 102, which is that part of the wellbore located inside the inner radius of the casing annulus, is filled with a borehole fluid or gas. Tubing may also be present, but is not shown here. Note that the methods and tools described in this disclosure are not limited to cased wellbores and may be used in open hole applications as well. A pulsed neutron logging tool 105 is lowered into the cylindrical volume 102 using a wireline 106. The pulsed neutron logging tool 105 includes a neutron generator nG, and one or more detectors, labeled here as ND (near detector) and FD (far detector) in FIG. 1. Each component will be described in more detail below.

During a pulsed neutron measurement, the neutron generator nG generates neutrons, which are released from the pulsed neutron logging tool 105 at greater than 1 MeV and typically about 14 MeV. The neutrons are represented as straight arrows labeled n in FIG. 1. The high-energy neutrons can undergo a variety of interactions with matter in the cylindrical volume 102, the casing 103, the cement 104, and the formation 101.

FIG. 2 illustrates three types of such interactions. One possible interaction is an elastic collision, also called elastic scattering, between a neutron n and a nucleus. In the illustrated example, the neutron n collides with a hydrogen nucleus, which consists of a single proton p. Hydrogen is omnipresent in most formations due to the pore spaces being filled with liquid hydrocarbons or water. In the elastic scattering process, the neutron n imparts some of its energy to the proton p, causing the proton to gain energy and the neutron to lose energy (i.e., to slow down). Since hydrogen is very light, it absorbs a large fraction of the neutron energy in each scattering, and plays a major role in the slowing down of fast neutrons. It is well known in the art that the liquid-filled porosity can be inferred by measuring the slowing down distance of fast neutrons.

In an inelastic collision, also called inelastic scattering, a neutron collides with a nucleus, imparting a portion of the neutron's energy to the nucleus. The neutron exits the collision with less energy than before. The energy that is transferred to the nucleus excites the nucleus, which subsequently emits a gamma ($\gamma$) photon when the nucleus relaxes. Nuclei of different atoms emit gamma photons having different energies. Therefore, the energy of the emitted gamma photon is indicative of the type of nucleus involved in an inelastic collision. For example, one can determine the ratios of carbon (indicative of hydrocarbons), oxygen (indicative of water), silicon (indicative of sandstone), and calcium (indicative of limestone) by measuring the energies of gamma photons generated during inelastic collisions with atoms of those substances near a wellbore.

Notice that both elastic and inelastic scattering cause neutrons to lose energy. After a high energy neutron has undergone a number of collisions, its energy will be reduced. Neutrons having an energy above approximately 1 MeV are considered fast neutrons. Fast neutrons can trigger gamma rays due to inelastic scattering, as described above. Neutrons that are slowed to about 0.4 to 100 eV are considered "epithermal neutrons" and neutrons that are slowed to about 0.025 eV are referred to as "thermal neutrons." Epithermal and thermal neutrons can participate in a third type of interaction whereby the thermal neutron is "captured" by the nucleus of an atom. The capturing nucleus becomes excited and emits a gamma photon when it relaxes. The nuclei of some atoms have a greater affinity to capture thermal neutrons than other nuclei.

As mentioned above, pulsed neutron measurements can be used to measure formation porosity. Such measurements are based on the fact that the slowing down of neutrons, and therefore the average distance travelled within the formations by the neutrons, is strongly dependent on the hydrogen content of the formation (i.e., hydrogen within the pore spaces of the formation). The hydrogen content dependency is due to the fact that neutrons can incur a very large energy loss in a single elastic scattering event with a proton (a hydrogen nucleus). However, such porosity measurements are strongly affected by the borehole environment (e.g. borehole fluid, casing configuration).

U.S. Pat. No. 10,001,582 describes a method for determining an environmentally corrected porosity of a formation that includes detecting gamma rays at two different positions from a position of a source of neutrons emitted neutrons into the formation at an energy level sufficient to induce inelastic scattering gamma rays. The neutrons are emitted in a plurality of bursts of neutrons into the formation, the bursts each having a first selected duration. Each burst is followed by a wait time having a second selected duration, the gamma rays being detected during each of the bursts and each of the wait times. A ratio of numbers of gamma rays detected during the bursts is determined (burst ratio). A ratio of numbers of gamma rays detected during the wait times is determined (capture ratio). The burst ratio is used to correct the capture ratio. The environmentally corrected porosity is determined from the corrected capture ratio.

U.S. Pat. No. 9,995,842 describes a method for determining an environmentally corrected porosity that includes using measurements of gamma rays detected during operation of a pulsed neutron source and numbers of burst and thermal neutron capture gamma rays made at two different axial spacings from a pulsed neutron source. The environmentally corrected porosity is calculated from a corrected capture ratio which is a function of either the burst ratio, capture ratio and capture/burst ratio or just the burst ratio and capture ratio.

The inventors have found that the prior art methods of compensating for borehole environment are strongly dependent on the capabilities of the logging tool, in particular, the burst width. Thus, there is a need in the art for more generally applicable methods of improving pulsed neutron measurements by correcting for borehole effects.

SUMMARY

Disclosed herein is a method of measuring a porosity of an earth formation traversed by a wellbore. According to some embodiments, the method comprises: receiving data generated by a logging tool, wherein the logging tool comprises: a neutron source configured to emit neutrons into the formation at an energy sufficient to induce inelastic scattering gamma rays and thermal capture gamma rays in the formation, a proximal gamma detector spaced a first axial distance from the neutron source, and a far gamma detector spaced a second axial distance from the neutron source. According to some embodiments, the data indicates total gamma rays detected at the proximal gamma detector and total gamma rays detected at the far gamma detector. According to some embodiments, the method comprises: determining a count of thermal capture gamma rays detected at the proximal gamma detector and a count of thermal capture gamma rays detected at the far gamma detector. According to some embodiments, the method comprises: determining a count of inelastic scattering gamma rays detected at the proximal gamma detector and a count of inelastic scattering gamma rays detected at the far gamma detector. According to some embodiments, the method comprises: determining a proximal-to-far thermal capture ratio as a ratio of the count of thermal capture gamma rays detected at the proximal gamma detector to the count of thermal capture gamma rays detected at the far gamma detector. According to some embodiments, the method comprises: determining a proximal-to-far inelastic ratio as a ratio of the count of inelastic scattering gamma rays detected at the proximal gamma detector to the count of inelastic scattering gamma rays detected at the far gamma detector. According to some embodiments, the method comprises: using the proximal-to-far thermal capture ratio and the proximal-to-far inelastic ratio to determine the porosity.

According to some embodiments, the data indicating the total gamma rays detected at the proximal gamma detector and the total gamma rays detected at the far gamma detector comprises, for each detector, a time spectrum indicating gamma ray counts detected at the detector as a function of time, wherein each time spectrum comprises a burst interval indicating gamma ray counts detected while the neutron source is emitting neutrons and a decay interval indicating gamma ray counts detected while the neutron source is not emitting neutrons. According to some embodiments, determining the count of thermal capture gamma rays detected at the proximal gamma detector and the count of thermal capture gamma rays detected at the far gamma detector comprises, for each of the proximal gamma detector and the far gamma detector: determining a count of thermal capture gamma rays detected during the decay interval at that detector, and determining a count of thermal capture gamma rays detected during the burst interval at that detector. According to some embodiments, determining a count of thermal capture gamma rays detected during the decay interval comprises integrating the time spectrum over the decay interval. According to some embodiments, determining a count of thermal capture gamma rays detected during the burst interval comprises: fitting a decay function to the decay interval of the time spectrum, determining a borehole component and a formation component of the decay function over the decay interval, convolving the borehole component and the formation component of the decay function over the burst interval, and summing the convolved borehole component and the convolved formation component over the burst interval to determine the count of thermal capture gamma rays detected during the burst interval. According to some embodiments, the decay function is a dual exponential function. According to some embodiments, determining a count of inelastic scattering gamma rays detected at the proximal gamma detector and a count of inelastic scattering gamma rays detected at the far gamma detector comprises, for each detector, subtracting the count of thermal capture gamma rays detected during the burst interval from the total gamma rays detected during the burst interval. According to some embodiments, using the proximal-to-far thermal capture ratio and the proximal-to-far inelastic ratio to determine the porosity comprises applying a correction function to the proximal-to-far thermal capture ratio to determine a corrected proximal-to-far capture ratio that is independent of borehole and casing configuration effects, wherein the correction function is a function of the proximal-to-far thermal capture ratio and the proximal-to-far inelastic ratio. According to some embodiments, the correction function is determined based on a plurality of calibration proximal-to-far ratios determined by modeling responses of the logging tool response under a plurality of modeled formation conditions. According to some embodiments, the correction function is determined based on a plurality of calibration proximal-to-far ratios determined by measuring responses of the logging tool to a plurality of calibration formation conditions. According to some embodiments, the method further comprises deploying the logging tool in the borehole and acquiring the data.

Also disclosed herein is a system for measuring a porosity of an earth formation traversed by a wellbore, the system comprising a logging tool comprising: a neutron source configured to emit neutrons into the formation at an energy sufficient to induce inelastic scattering gamma rays and thermal capture gamma rays in the formation, a proximal gamma detector spaced a first axial distance from the neutron source, and a far gamma detector spaced a second axial distance from the neutron source. The system further comprises a computer configured to: receive data generated by the logging tool, wherein the data indicates total gamma rays detected at the proximal gamma detector and total gamma rays detected at the far gamma detector, from the data, determine a count of thermal capture gamma rays detected at the proximal gamma detector and a count of thermal capture gamma rays detected at the far gamma detector, from the data, determine a count of inelastic scattering gamma rays detected at the proximal gamma detector and a count of inelastic scattering gamma rays detected at the far gamma detector, determine a proximal-to-far thermal capture ratio as a ratio of the count of thermal capture gamma rays detected at the proximal gamma detector to the count of thermal capture gamma rays detected at the far gamma detector, determine a proximal-to-far inelastic ratio as a ratio of the count of inelastic scattering gamma rays detected at the proximal gamma detector to the count of inelastic scattering gamma rays detected at the far gamma detector, and determine the porosity from the proximal-to-far thermal capture ratio and the proximal-to-far inelastic ratio. According to some embodiments, the data indicating the total gamma rays detected at the proximal gamma detector and the total gamma rays detected at the far gamma detector comprises, for each detector, a time spectrum indicating gamma ray counts detected at the detector as a function of time, wherein each time spectrum comprises a burst interval indicating gamma ray counts detected while the neutron source is emitting neutrons and a decay interval indicating gamma ray counts detected while the neutron source is not emitting neutrons. According to some embodiments, determining the count of thermal capture gamma rays detected at the proximal gamma detector and the count of thermal capture gamma rays detected at the far gamma detector comprises, for each of the proximal gamma detector and the far gamma detector: determining a count of thermal capture gamma rays detected during the decay interval at that detector, and determining a count of thermal capture gamma rays detected during the burst interval at that detector. According to some embodiments, determining a count of thermal capture gamma rays detected during the decay interval comprises integrating the time spectrum over the decay interval. According to some embodiments, determining a count of thermal capture gamma rays detected during the burst interval comprises: fitting a decay function to the decay interval of the time spectrum, determining a borehole component and a formation component of the decay function over the decay interval, convolving the borehole component and the formation component of the decay function over the burst interval, and summing the convolved borehole component and the convolved formation component over the burst interval to determine the count of thermal capture gamma rays detected during the burst interval. According to some embodiments, the decay function is a dual exponential function. According to some embodiments, determining a count of inelastic scattering gamma rays detected at the proximal gamma detector and a count of inelastic scattering gamma rays detected at the far gamma detector comprises, for each detector, subtracting the count of thermal capture gamma rays detected during the burst interval from the total gamma rays detected during the burst interval. According to some embodiments, using the proximal-to-far thermal capture ratio and the proximal-to-far inelastic ratio to determine the porosity comprises applying a correction function to the proximal-to-far thermal capture ratio to determine a corrected proximal-to-far capture ratio that is independent of borehole and casing configuration effects, wherein the correction function is a function of the proximal-to-far thermal capture ratio and the proximal-to-far inelastic ratio. According to some embodiments, the correction function is determined based on a plurality of calibration proximal-to-far ratios, wherein the plurality of calibration proximal-to-far ratios is determined by one or more of: modeling responses of the logging tool response under a plurality of modeled formation conditions, and measuring responses of the logging tool to a plurality of calibration formation conditions.

Also disclosed herein is a method of measuring a porosity of an earth formation traversed by a wellbore, the method comprising receiving data generated by a logging tool, wherein the logging tool comprises: a neutron source configured to emit neutrons into the formation at an energy sufficient to induce inelastic scattering gamma rays and thermal capture gamma rays in the formation, a proximal gamma detector spaced a first axial distance from the neutron source, and a far gamma detector spaced a second axial distance from the neutron source. According to some embodiments, the data indicates total gamma rays detected at the proximal gamma detector and total gamma rays detected at the far gamma detector. According to some embodiments, the method comprises: from the data, determining a count of thermal capture gamma rays detected at the proximal gamma detector and a count of thermal capture gamma rays detected at the far gamma detector, determining a proximal-to-far thermal capture ratio as a ratio of the count of thermal capture gamma rays detected at the proximal gamma detector to the count of thermal capture gamma rays detected at the far gamma detector, determining a borehole thermal neutron capture cross section, and using the proximal-to-far thermal capture ratio and the borehole thermal neutron capture cross section to determine the porosity. According to some embodiments, the data indicating the total gamma rays detected at the proximal gamma detector and the total gamma rays detected at the far gamma detector comprises, for each detector, a time spectrum indicating gamma ray counts detected at the detector as a function of time, wherein each time spectrum comprises a burst interval indicating gamma ray counts detected while the neutron source is emitting neutrons and a decay interval indicating gamma ray counts detected while the neutron source is not emitting neutrons. According to some embodiments, determining the count of thermal capture gamma rays detected at the proximal gamma detector and the count of thermal capture gamma rays detected at the far gamma detector comprises, for each of the proximal gamma detector and the far gamma detector: determining a count of thermal capture gamma rays detected during the decay interval at that detector, and determining a count of thermal capture gamma rays detected during the burst interval at that detector. According to some embodiments, determining a count of thermal capture gamma rays detected during the decay interval comprises integrating the time spectrum over the decay interval. According to some embodiments, determining a count of borehole thermal capture gamma rays detected during the decay interval comprises: fitting a decay function to the decay interval of the time spectrum, and determining a borehole component and a formation component of the decay function over the decay interval. According to some embodiments, the decay function is a dual exponential function (DEF). According to some embodiments, the dual exponential function (DEF) is expressed as: $DEF = A_{BH}*\exp(-t/\tau_{BH}) + A_F*\exp(-t/\tau_F)$, where $A_{BH}$ and $A_F$ are coefficients, t is time, $\tau_{BH}$ is a borehole decay constant, and $\tau_F$ is a formation decay constant. According to some embodiments, the borehole thermal neutron capture cross section is determined based on $\tau_{BH}$.

DESCRIPTION

Figure 1:
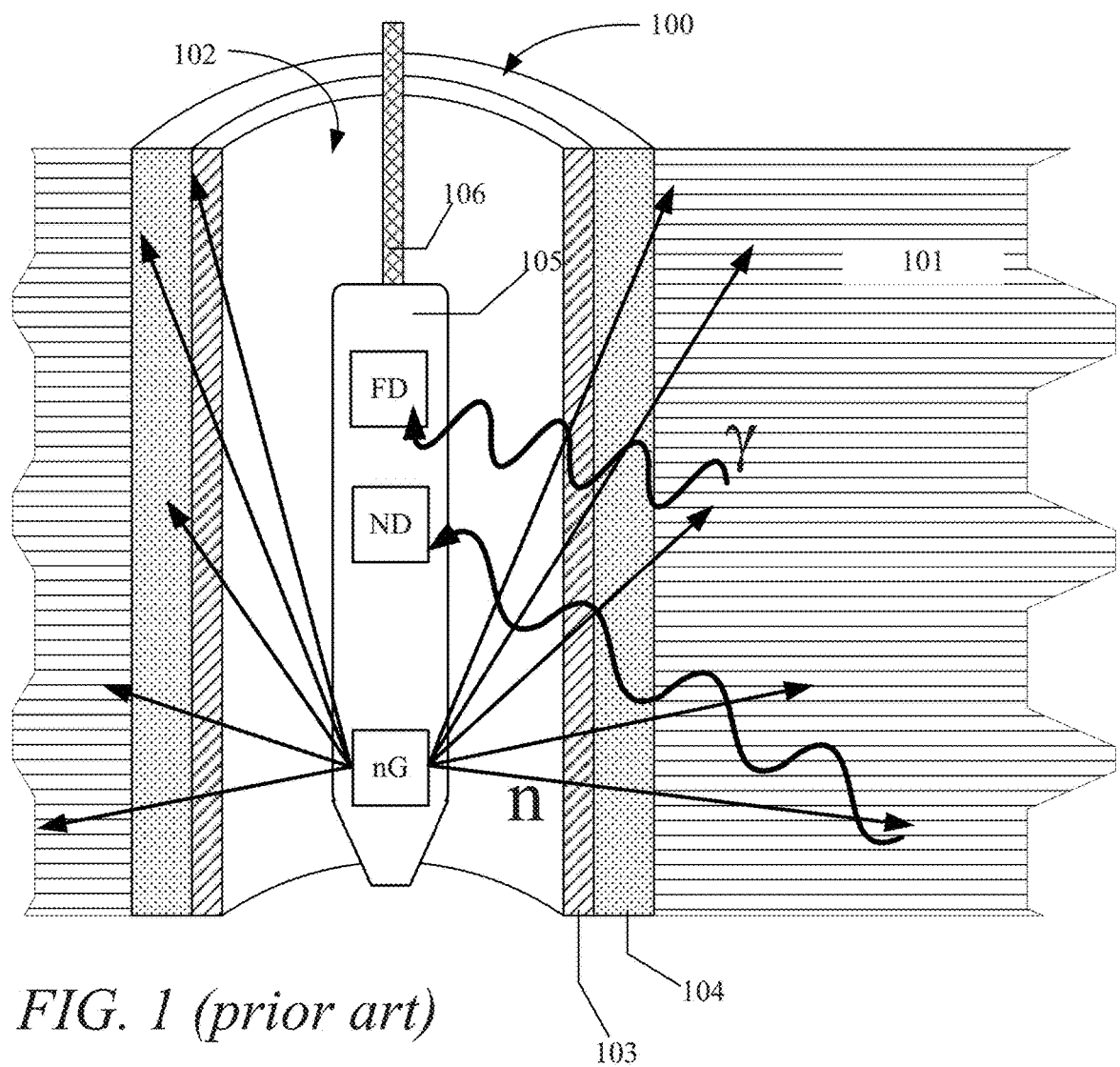
FIG. 1 shows a logging tool according to the prior art.
Figure 2:
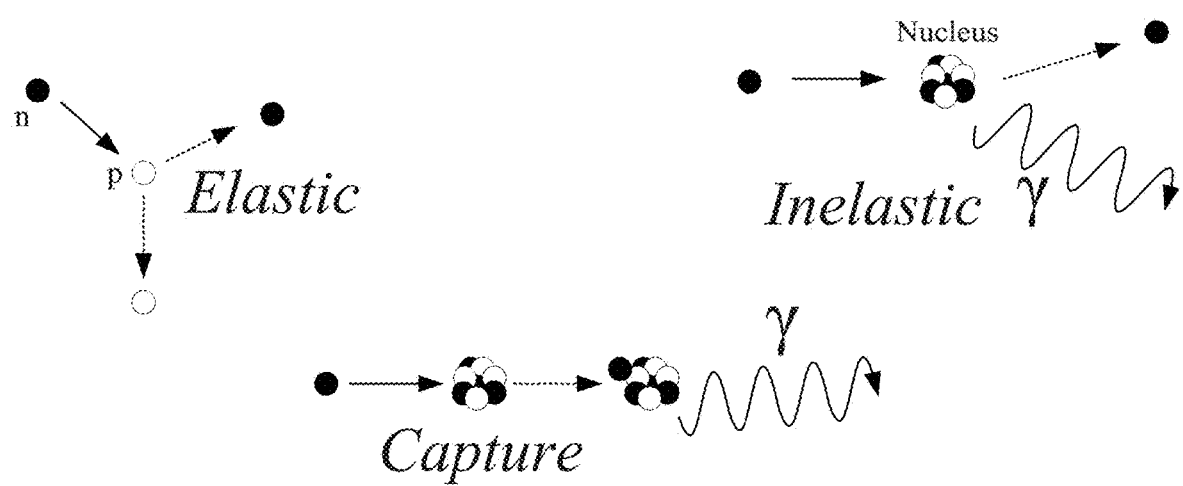
FIG. 2 shows interactions of fast neutrons according to the prior art.
Figure 3:
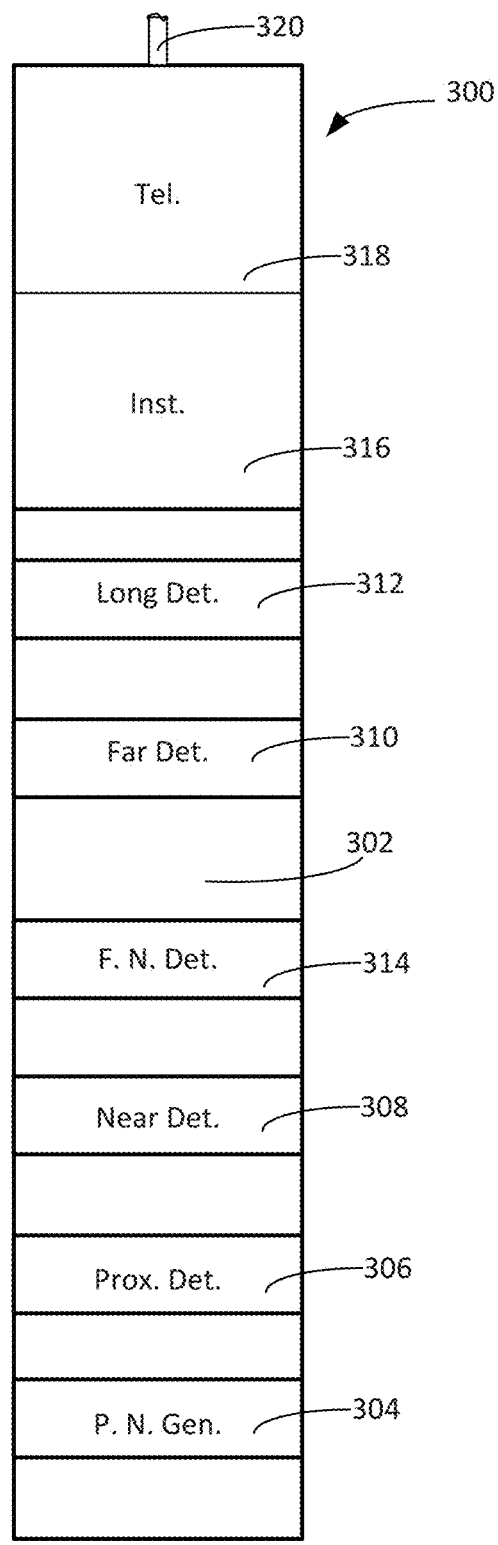
FIG. 3 shows an embodiment of a logging tool according to aspects of the disclosure.

FIG. 3 shows the layout of a typical pulsed neutron logging tool 300 according to the disclosure. Subsection 302 houses an array of detector assemblies as well as a pulsed neutron generator 304. More specifically, there are four detector assemblies in the illustrated embodiment, each comprising a $LaBr_3$ crystal coupled to a photomultiplier tube and a digital spectrometer for filtering and pulse inspection. These detector assemblies are referred to as the Proximal (Prox) detector assembly 306, the Near detector assembly 308, the Far detector assembly 310, and Long detector assembly 312. These detector assemblies are disposed at increasing axial spacings from the neutron generator 304, as their names imply. Between the near detector assembly 308 and the far detector assembly 310 is disposed a fast neutron detector 314 that measures the fast neutron flux.

The subsection 302 is operationally connected to an instrument subsection 316. The instrument subsection houses control circuits and power circuits to operate and control the elements of the subsection 302. A telemetry subsection 318 is operationally connected to the instrument section 316. A suitable connector connects the logging tool to a lower end of a preferably multiconductor logging cable 320. The upper end of the logging cable 320 terminates at a draw works, which is well known in the art and is not shown in the illustration. It should be noted that other embodiments of a logging tools are within the scope of the disclosure. For example, the illustrated embodiment is an example of a tool configured to be conveyed into a wellbore via a cable, such as logging cable 320. However, other embodiments may be included as a part or subsection of other conveyed components, for example, as part of a drilling string for LWD/MWD applications. Moreover, although shown embodied in a wireline logging tool, the detector assembly 302 can also be embodied in other borehole instruments. These instruments include pump-down ("memory") instruments conveyed by drilling fluid flow, instruments conveyed by coiled tubing, instruments conveyed by a drill string, and instruments conveyed by a "slick line".

Still referring to FIG. 3, detector assembly response data are telemetered from the tool 300 to the surface of the earth where they are received by an uphole telemetry unit (not shown) typically disposed within surface equipment. These data can be processed in a surface processor (not shown) within the surface equipment to yield a log of one or more parameters of interest. Alternately, data can be partially or completely processed in a downhole processor, for example, within the instrument section 316 and telemetered via the telemetry subsection 318 to the surface equipment. Control parameters can also be telemetered from the surface equipment to the tool 300 via the telemetry system and wireline cable 320.

Figure 4:
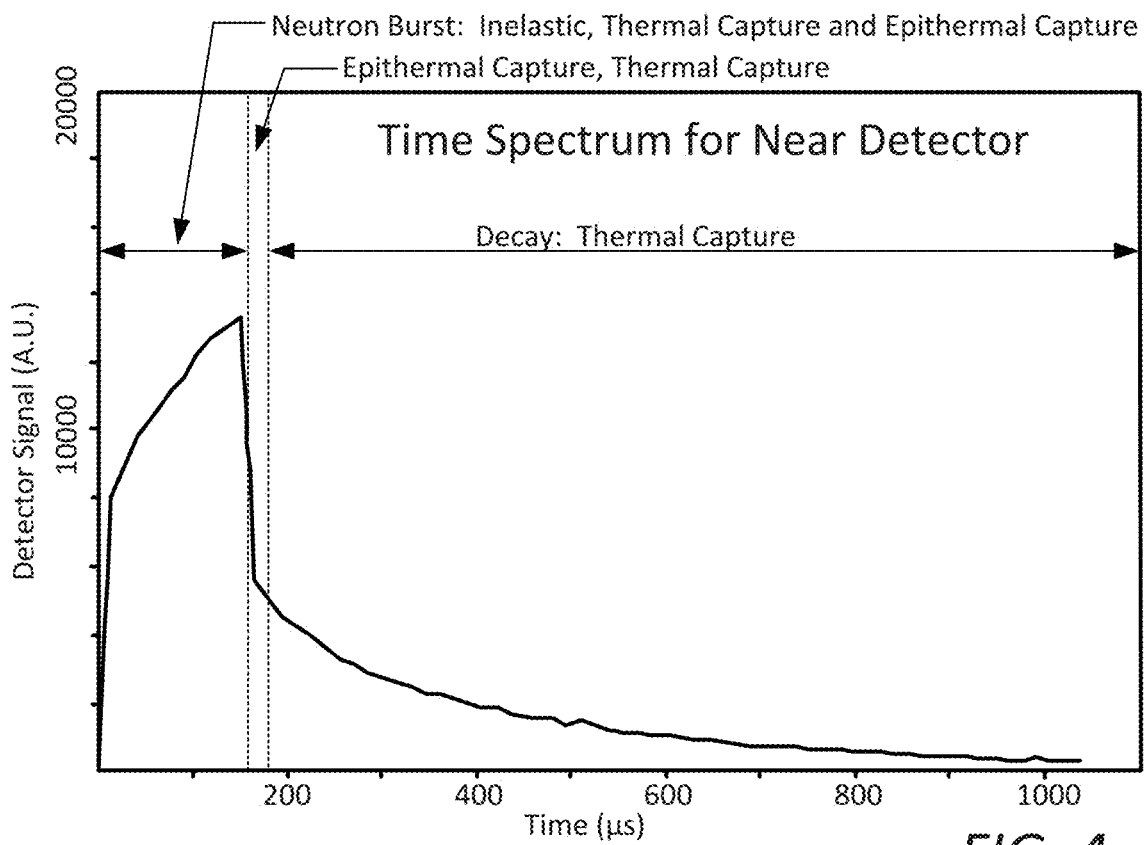
FIG. 4 shows a temporal profile of gamma ray count rate at a detector.

FIG. 4 shows the temporal profile of the gamma ray count rate in one of the detectors (e.g., the near detector) during a pulsed neutron measurement. During the illustrated pulsed neutron measurement, the neutron generator generates neutrons during a burst lasting about 150 µs. During the neutron burst the gamma rays detected include gamma rays generated by inelastic scattering, thermal capture, and epithermal capture. Once the neutron burst is terminated, the detected gamma signal begins to decay. For a very short time following the burst, gamma rays due to epithermal and thermal neutron capture are detected, followed by a longer decay period during which all of the detected gammas arise from thermal capture events.

Figure 5:
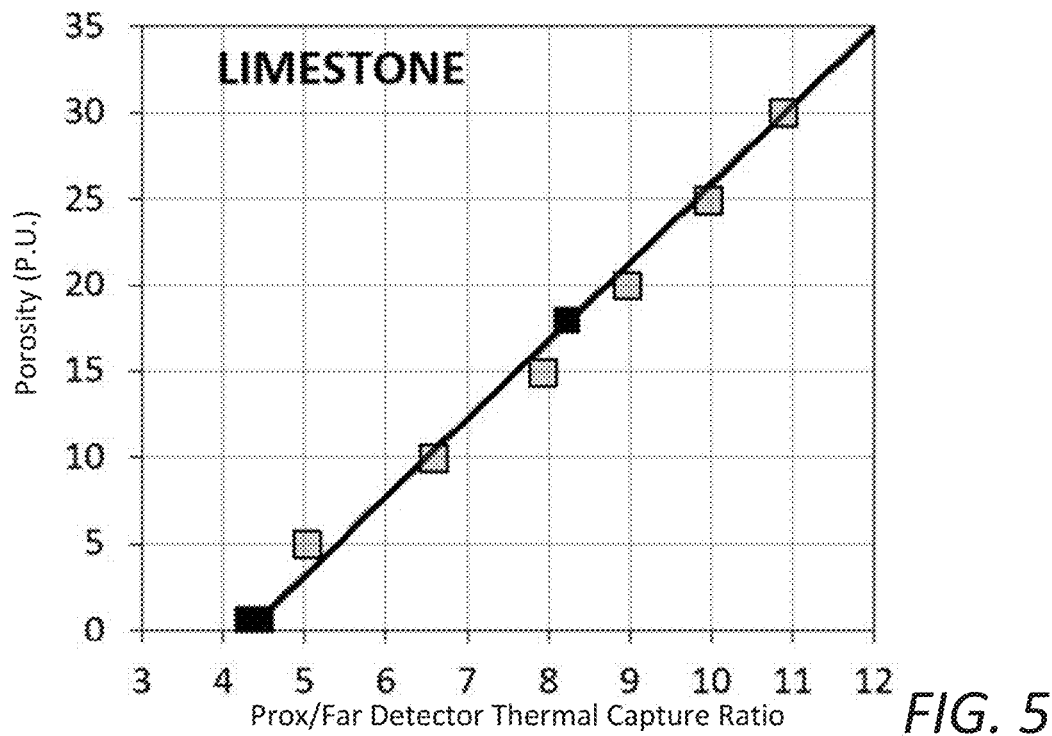
FIG. 5 shows a plot of porosity as a function of the Prox/Far thermal capture ratio for a liquid-filled borehole.

It is known that the counting yield of each type of gamma ray reaction is sensitive to certain properties of the formation and/or properties of the wellbore. For example, porosity information can be obtained from a measured capture ratio (i.e., the total capture decay counts in one detector relative to another). FIG. 5 shows an example of a ratio-to-porosity transform based on measured data and Monte Carlo modeling of the thermal capture ratio of the Proximal detector to the Far detector of a logging tool (FIG. 3).

However, it is important to note that the thermal capture ratio is also sensitive to the borehole fluid and casing configuration. Therefore, in order to obtain a porosity measurement that is sensitive solely to the formation, the borehole sensitivity must be accounted for.

This disclosure provides a new technique for removing the borehole sensitivity from the porosity measurement. The technique relies on the observation that the inelastic ratio (e.g., the ratio of inelastic gamma counts measured at the Proximal detector to the inelastic gamma counts measured at the Far detector) is sensitive only to the borehole fluid and casing configuration and is not sensitive to formation porosity. The inventors have discovered that the inelastic ratio can be used to correct for the borehole effects contained within the capture ratio porosity determination. By removing the borehole dependence from the capture ratio, we are left with only the porosity dependence, which is the desired measurement.

Figure 6:
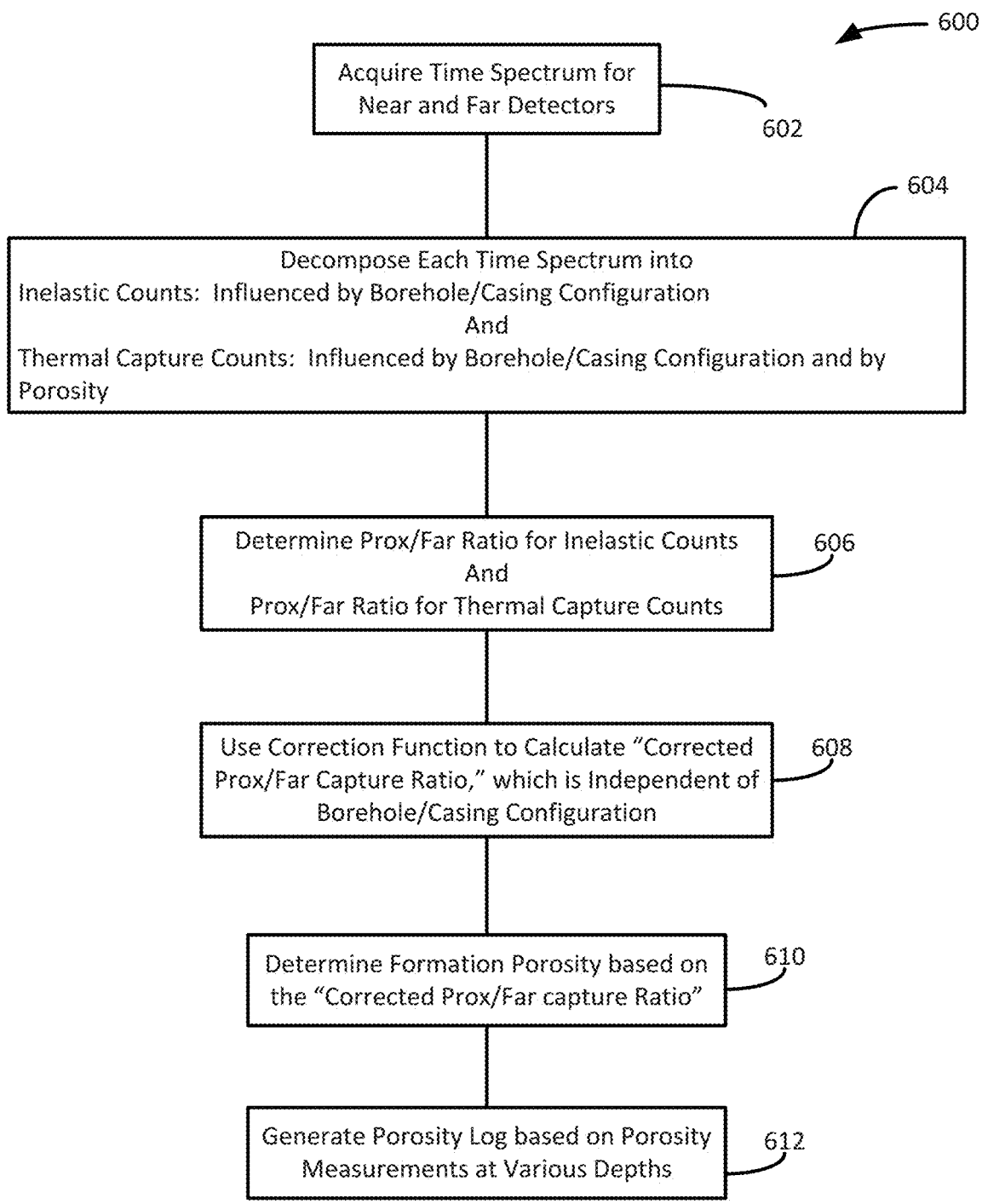
FIG. 6 shows an embodiment for correcting a porosity measurement to account for borehole/casing configuration effects, according to aspects of the disclosure.

FIG. 6 illustrates the steps of an embodiment 600 of the disclosed method, at a high level. According to the illustrated embodiment, time spectra (such as shown in FIG. 4) are acquired at two detectors that are axially spaced from one another 602. For example, referring to FIG. 3, the spectra could be acquired at the Prox detector 306 and Far detector 310 of the logging tool 300. It should be noted, however, that other detectors could be used (e.g., any two detectors selected from the Proximal detector 306, Near detector 308, Far detector 310, or the Long detector 312, etc.). The point is that gamma counts are recorded at two detectors axially spaced from one another so that ratios of the counts can be determined. For simplicity, such ratios will be referred to herein as Prox/Far ratios, even though it is understood that any two detectors may be implicated.

Once the time spectra are acquired for the Prox and Far detectors, each time spectrum is processed to determine the contribution of inelastic counts and thermal capture counts to the spectrum 604. Again, the reason for determining the contribution for each of the two processes is because inelastic scattering is influenced only by borehole/casing configuration effects, whereas thermal capture is influenced both by borehole/casing configuration effects and by formation porosity. Referring again to the time spectrum illustrated in FIG. 4, the decay region following the burst is due solely to thermal capture events. So, determining the thermal capture counts for that region is simply a matter of integrating the area under the curve. However, the burst region of the spectrum from 0 to 150 μs is indicative of both inelastic and thermal capture events. Thus, that region must be decomposed to determine the counts resulting from each of those processes.

Figure 7A:
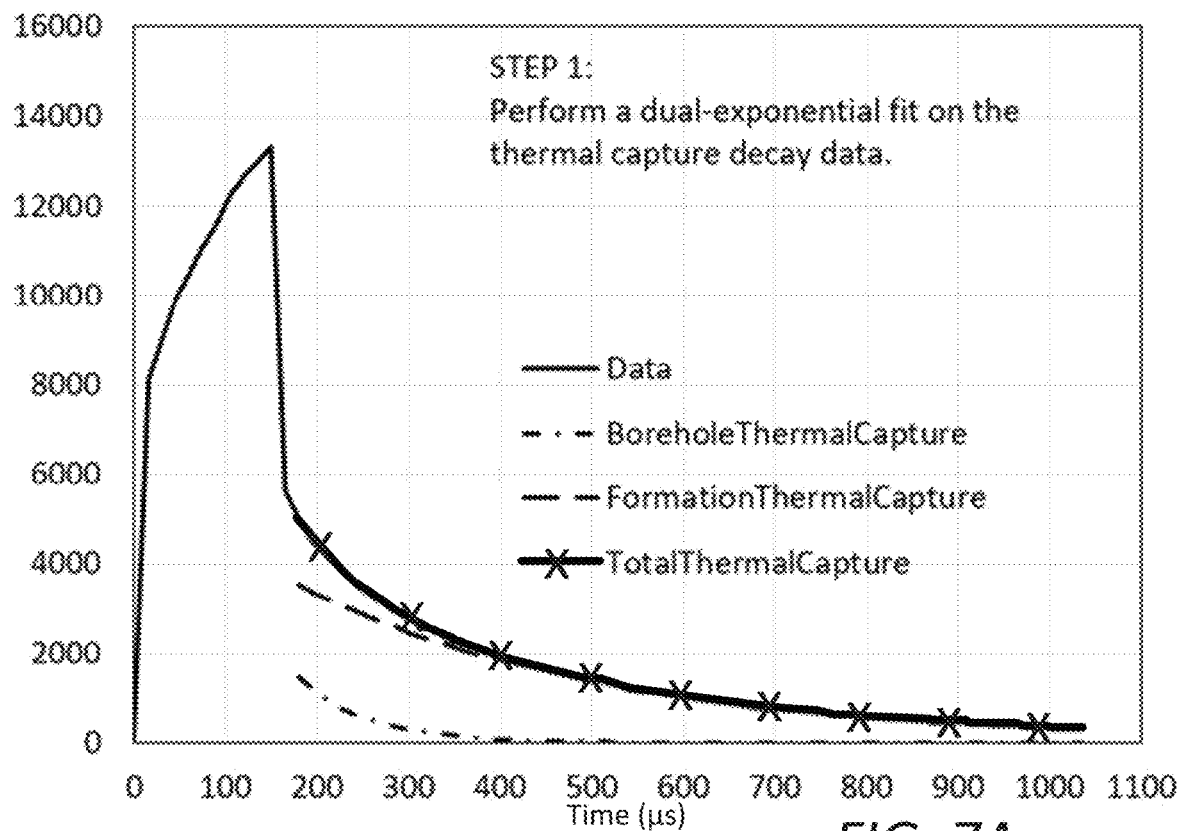
FIGS. 7A-7C show processing of a temporal profile of gamma ray count rate to determine contributions of inelastic scattering and thermal capture.

A method of decomposing the burst region to determine the contribution of inelastic counts and thermal capture counts is described with reference to FIGS. 7A-7C. In Step 1 of an exemplary embodiment shown in FIG. 7A, the decay capture region is fit with a dual-exponential function:

$$\text{Dual\_exponential\_function} = A_{BH} * \exp(-t/\tau_{BH}) + A_F * \exp(-t/\tau_F), \quad (\text{Eq-1})$$

where $A_{BH}$ and $A_F$ are the borehole and formation amplitudes, and $\tau_{BH}$ and $\tau_F$ are the borehole and formation decay time constants. According to some embodiments, the fitting can be performed in real time with a weighted least-squares minimization technique. The result of the fitting is the amplitudes and decay time constants for both the borehole and formation components of the thermal capture spectrum.

Figure 7B:
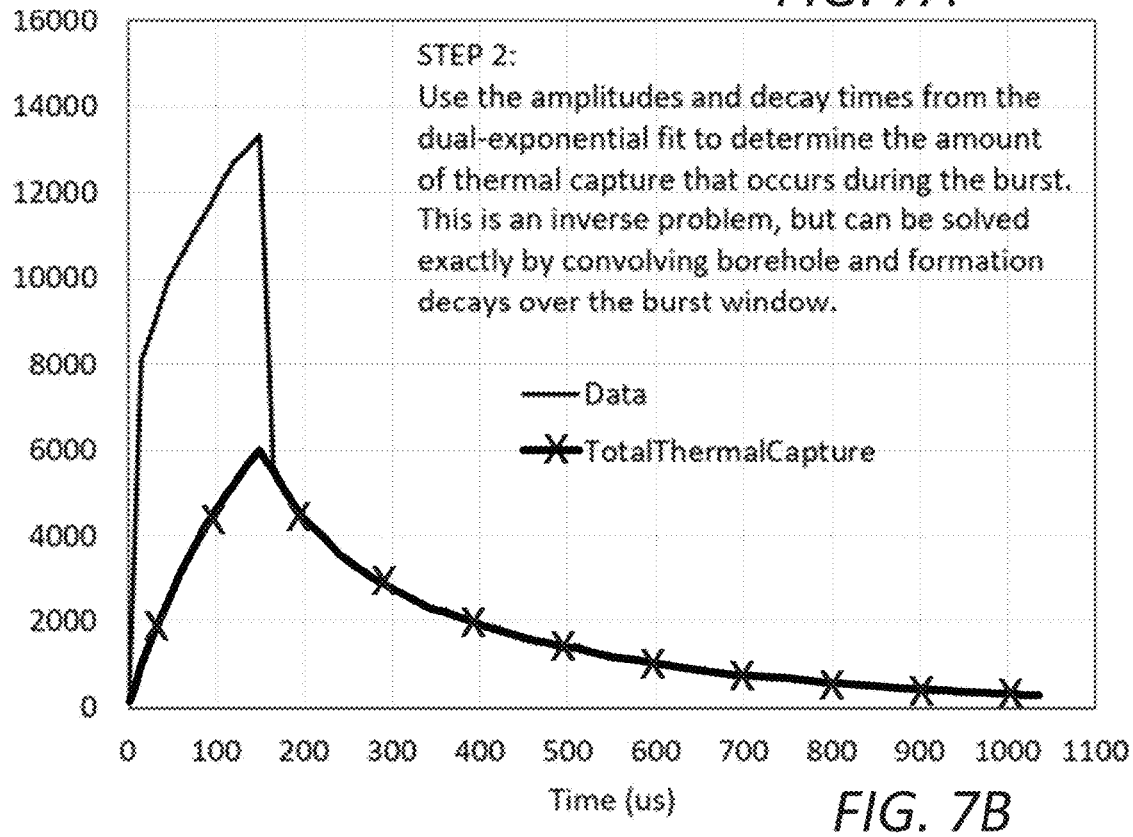
Figure 7C:
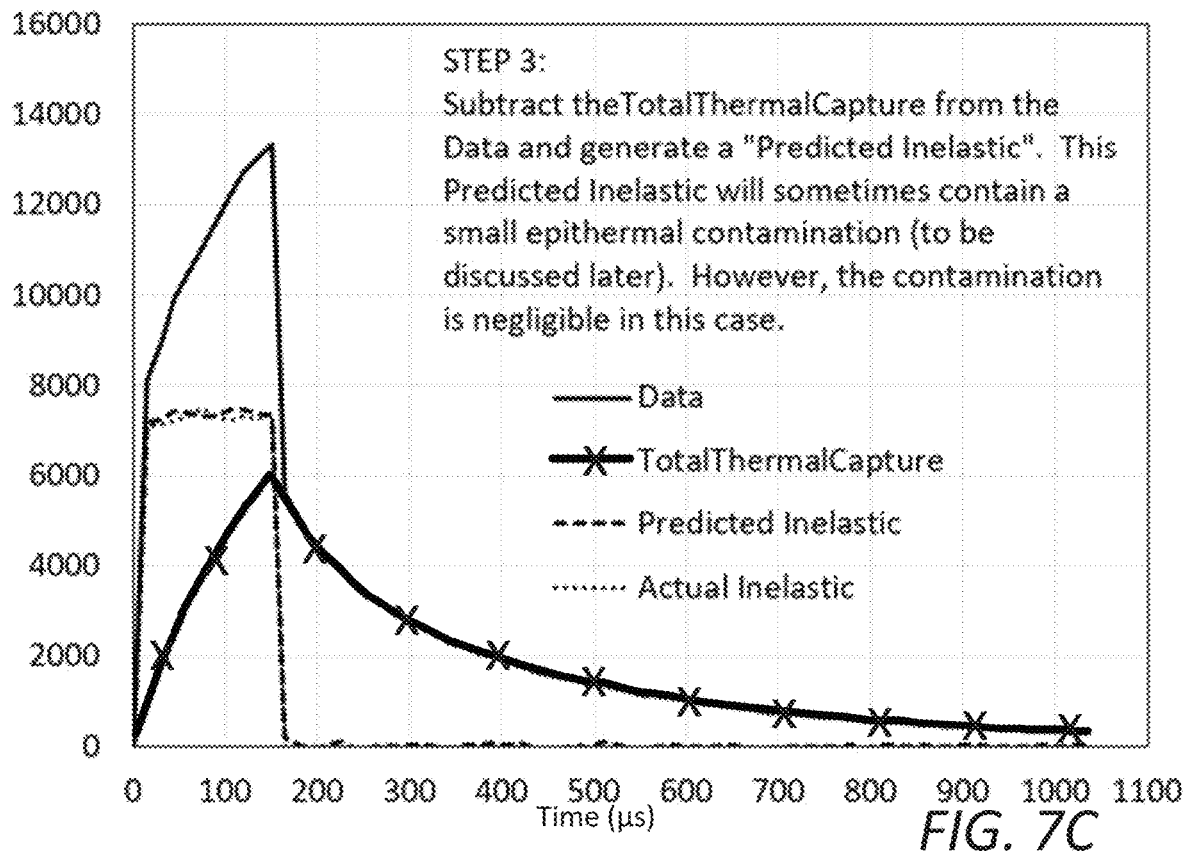

In Step 2 of the exemplary embodiment shown in FIG. 7B, the amplitudes and decay time constants from the dual-exponential fit are used to determine the amount of thermal capture that occurs during the burst region of the time spectrum. It should be noted that this is an inverse problem, but can be solved exactly by convolving borehole and formation decays over the burst window. This can be explained as follows. The results of the dual exponential fit to the decay region are amplitudes and decay times for the borehole (BH) and formation (F) decays. If we choose the time variable, t, to start before the burst, we can re-express Eq.1 in the following form appropriate for the decay region ($t_{DECAYSTART} < t < t_{DECAYEND}$):

Decay Region $$TC_{TOTAL}(t) = A_{BH,DECAYSTART} * \exp(-(t-t_{DECAYSTART})/\tau_{BH}) + A_{F,DECAYSTART} * \exp(-(t-t_{DECAYSTART})/\tau_F), \quad (\text{Eq-2})$$

where $TC_{TOTAL}(t)$ is the total thermal capture at time t, $t_{DECAYSTART}$ is the time at the start of the decay window (which follows the burst window, $t_{BURSEND}$), $t_{DECAYEND}$ is the time at the end of the decay window (>1000 μs so as to allow a full decay), $A_{BH,DECAYSTART}$ and $A_{F,DECAYSTART}$ are the borehole and formation amplitudes at $t_{DECAYSTART}$, and $\tau_{BH}$ and $\tau_F$ are the borehole and formation decay times.

For the burst region ($t_{BURSTSTART} < t < t_{BURSTEND}$), we can convolve an exponential function over the known width of the burst gate and determine a relationship between the strength of the convolving exponential ($TC_{BH}$ or $TC_F$) and the amplitude and decay times as determined during the dual-exponential fit of the decay region:

Burst Region $$TC_{BH}(t) = A_{BH,DECAYSTART} * \exp((t_{DECAYSTART} - t_{BURSTEND})/\tau_{BH}) * (1 - \exp(-t/\tau_{BH}))/(1 - \exp(-t_{BURSTEND}/\tau_{BH})),$$

$$TC_F(t) = A_{F,DECAYSTART} * \exp((t_{DECAYSTART} - t_{BURSTEND})/\tau_F) * (1 - \exp(-t/\tau_F))/(1 - \exp(-t_{BURSTEND}/\tau_F)),$$

$$TC_{TOTAL}(t) = TC_{BH}(t) + TC_F(t) \quad (\text{Eq.3})$$

where $TC_{TOTAL}(t)$ is the total Thermal Capture at time t during the burst window (0 to 150 μs in the current examples).

Once Eq.3 is solved, the total thermal capture can then be subtracted from burst data in order to obtain an inelastic contribution:

$$I(t) = \text{Burst}(t) - TC_{TOTAL}(t) \quad (\text{Eq.4})$$

where I(t) is the inelastic yield during the burst, and Burst(t) is the measured data during the burst.

Figure 8A:
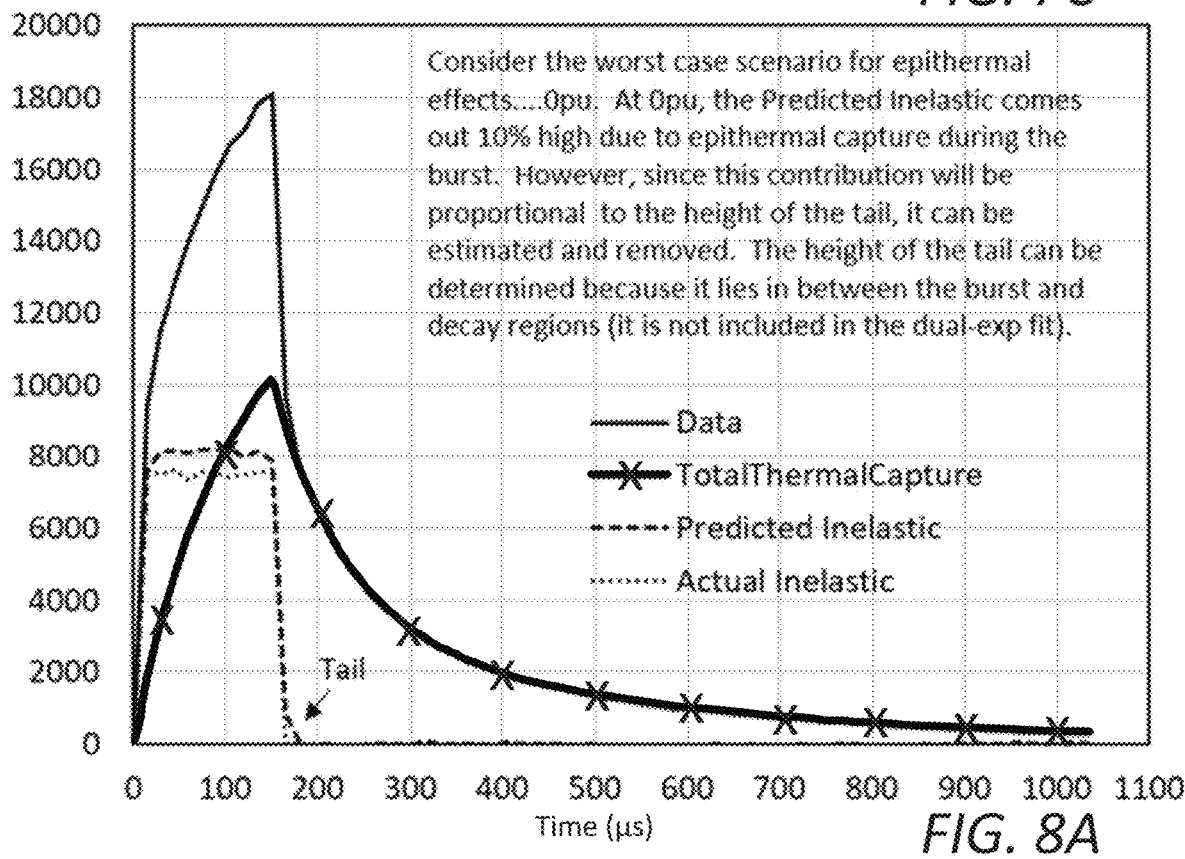
FIGS. 8A-8B show correction for epithermal neutron capture.
Figure 8B:
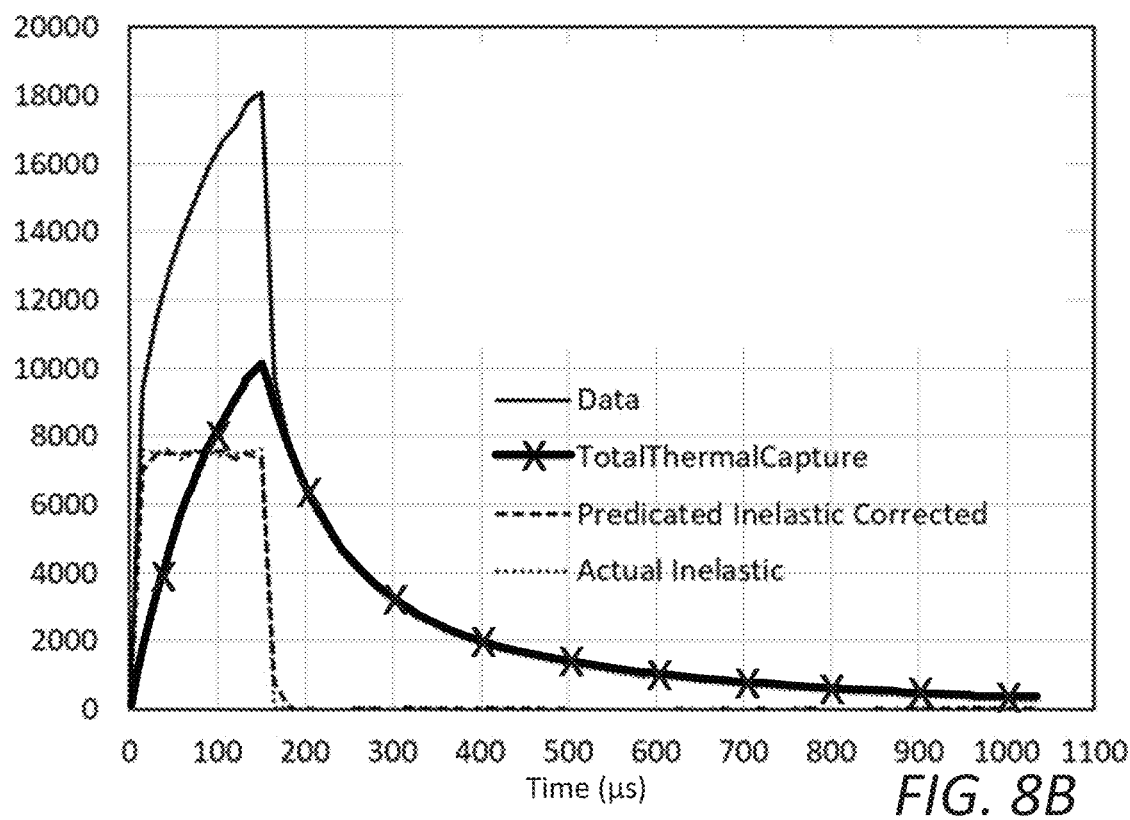

In Step 3 (FIG. 7C), the total thermal capture is subtracted from the measured Data to generate the inelastic yield. The inelastic yield obtained in the above manner does not account for epithermal effects. Although epithermal effects are usually small or entirely negligible, there are situations where they will be present (e.g. at small borehole size and low porosity). In these cases, the epithermal will be misidentified as inelastic, and the inelastic answer will appear slightly high. This can be corrected for as shown in FIGS. 8A and 8B. Since the dual exponential fit does not include the epithermal+thermal capture window of FIG. 4, any residual I(t) strength in this window, after subtracting the Total Thermal Capture, is due to epithermal capture. This will appear as a tail on the inelastic yield. The height of the tail can be used to correct the inelastic yield for epithermal capture. FIG. 8B shows the inelastic yield corrected based on the height of the epithermal capture tail.

Referring again to FIG. 6, once each of the time spectra at each of the detectors are decomposed into their respective inelastic and thermal capture contributions, a ratio of inelastic counts for the Proximal detector to the inelastic counts for the Far detector can be determined. Likewise, a ratio of thermal capture counts for the Proximal detector to the thermal counts for the Far detector can be determined. In other words, Prox/Far ratios are determined for both the inelastic and thermal counts 606.

Again, recall that the Prox/Far thermal capture ratio is a function of the formation porosity (as shown in FIG. 5), which is the parameter we seek to measure. However, the Prox/Far thermal capture ratio is also sensitive to borehole/casing configuration effects, which can complicate the porosity determination. Thus, the inventors have developed techniques for using the Prox/Far inelastic ratio to correct for borehole/casing configuration effects that are included in the prox/far thermal capture ratio.

According to some embodiments, a correction function 608, based on the Prox/Far inelastic ratio, is applied to the measured Prox/Far thermal capture ratio to determine a "corrected Prox/Far capture ratio," which is independent of borehole/casing configuration effects and depends only on the formation porosity. The correction function is derived based on a set of "calibration Prox/Far values" that are determined either by modeling (e.g., Monte Carlo N-Particle (MCNP) modeling) of the logging tool or by performing laboratory measurements using the logging tool on known samples. The derivation of the calibration Prox/Far values are described below.

According to some embodiments, the calibration prox/far values are determined based on modeling the logging tool's responses under a variety of modeled borehole/casing configurations and porosities. An example of such modeling is Monte Carlo N-Particle (MCNP) modeling, which is familiar in the art (see, e.g., Cox, L. J. et al, MCNP version 5, Los Alamos National Laboratory, Los Alamos, N. Mex. (2002)). To construct such a model, a temporal profile of the gamma ray count rates (i.e., time spectra similar to FIG. 4) is modeled for a Prox and Far detector of the tool under each of the borehole/casing configurations and porosities. Once the temporal gamma ray count rates (i.e., time spectra) for the detectors is determined (either by modeling or laboratory measurement) for a Prox and Far detector under each of the casing configurations and porosities, each of the time spectra are analyzed to determine the inelastic counts and the thermal capture counts, as described above in reference to FIGS. 7A-7C. This allows a determination of a Prox/Far inelastic ratio and a Prox/Far thermal capture ratio for each casing configuration and porosity. These determined Prox/Far inelastic ratios and a Prox/Far thermal capture ratios are referred to herein as the "calibration Prox/Far ratios." The calibration Prox/Far inelastic and thermal capture ratios are used to derive a correction function.

Figure 9:
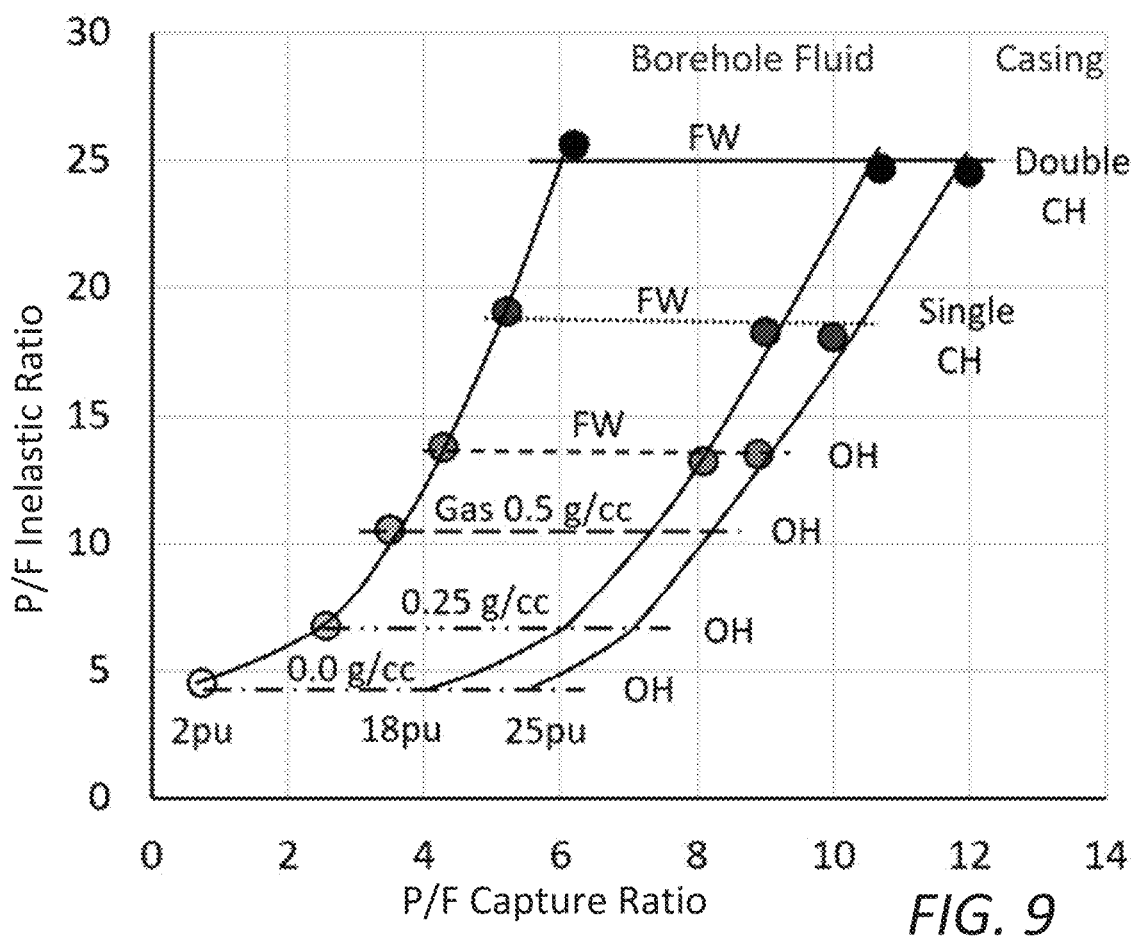
FIG. 9 shows MCNP simulated Prox/Far (P/F) inelastic and capture ratios for three different porosities, and various different borehole fluid/casing configurations, in a limestone formation.

FIG. 9 illustrates calibration Prox/Far inelastic ratios cross plotted against calibration prox/far thermal capture ratios determined from MCNP modeling of the logging tool response in water filled limestone formations of porosities of 2, 18, and 25 pu. Curved lines connect the respective data at each porosity. The progression of the lines upwards represents the increasing effective density of the borehole environment. The borehole fluid is seen to vary from lower density gas to higher density gas to fresh water (FW). The casing configuration is seen to vary from open-hole (OH) to single cased hole (CH) to double CH. Notice that the calibration Prox/Far inelastic ratios are essentially independent of porosity but are dependent on the borehole fluid and casing configuration. However, the calibration prox/far thermal capture ratios are dependent both on the borehole fluid/casing configuration and on the porosity.

The three curved lines in FIG. 9, which connect the points associated with each porosity, have nearly the same shape, but are shifted horizontally. To a good approximation, the slopes are similar, and nearly independent of porosity. This indicates that, to a good approximation, a given change in the P/F inelastic ratio, due to a change in borehole conditions, will result in a given change to the P/F capture ratio. This means that by measuring a change in the P/F inelastic ratio, we can determine a correction term for the P/F capture ratio that will be applicable to all porosities.

Figure 10A:
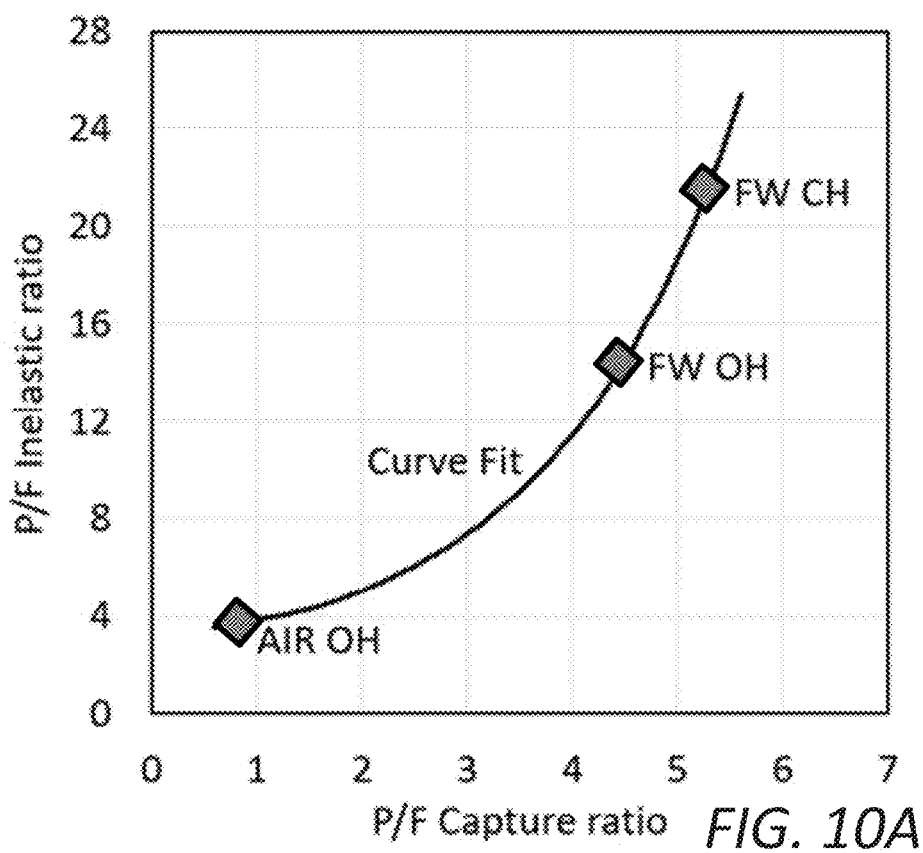
FIGS. 10A-10C show the process for experimentally determining a borehole correction for the Prox/Far capture ratio.
Figure 10B:
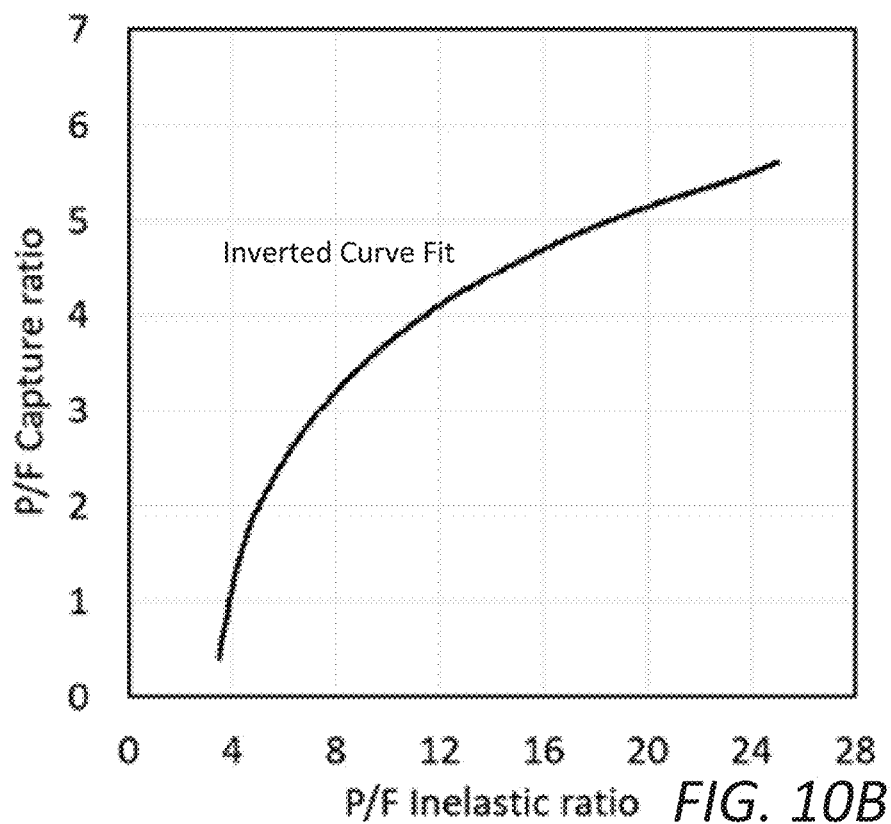
Figure 10C:
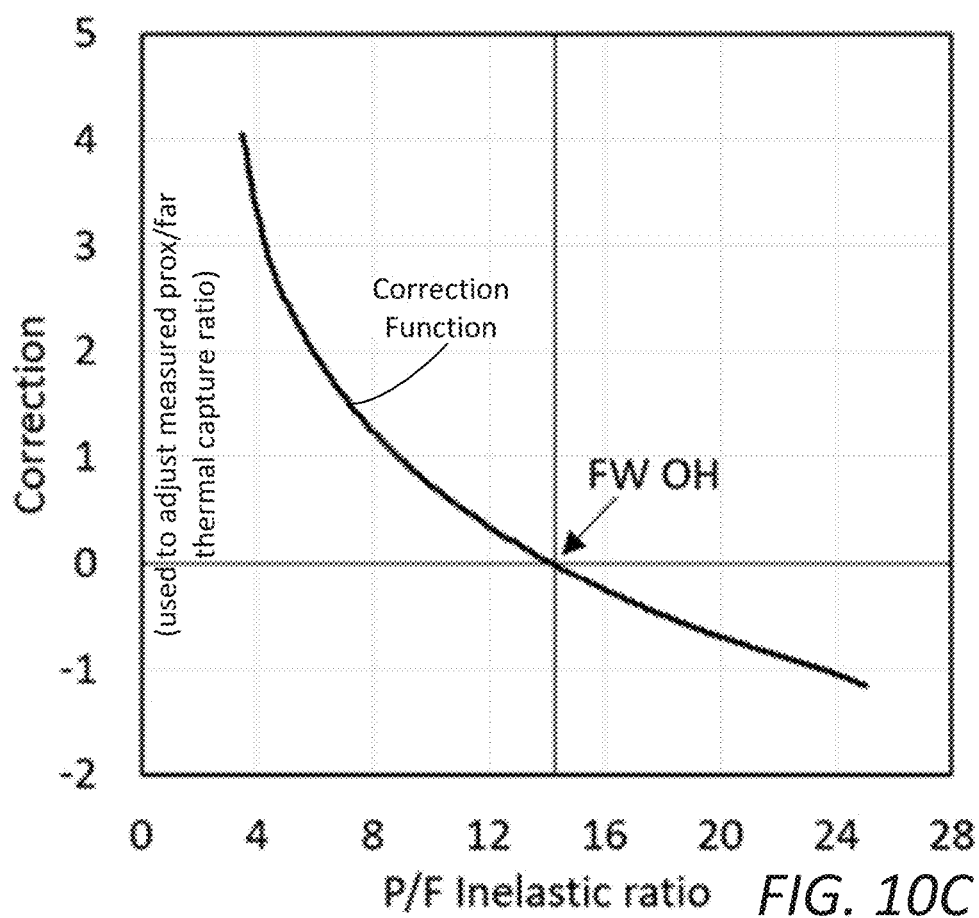

FIGS. 10A-10C show a procedure to derive a correction function for the Prox/Far capture ratio in the laboratory. FIG. 10A shows an experimentally derived curve-fit from three measurements in a sandstone block. In each of the measurements, the borehole environment was changed. The first measurement was for open-hole (OH) air, the second measurement was for OH fresh water (FW), and the third measurement was for cased-hole (CH) FW. In FIG. 10B, the curve fit is inverted. The difference between the Prox/Far capture ratio in FW OH and the Prox/Far capture ratio of the inverted curve-fit is then the correction function that can be applied, as an additive term, to the measured Prox/Far capture ratio. FIG. 10C shows the correction function derived from FIG. 10B. It is possible that the correction function plotted in FIG. 10C could be given a Prox/Far capture ratio dependence in order to make it slightly more accurate, but it should work as is to a good approximation.

For any measured prox/far thermal capture ratio, regardless of the borehole/casing configuration, the correction function allows one to extrapolate to a "corrected Prox/Far capture ratio." The "corrected Prox/Far capture ratio" is dependent only on porosity and is not dependent on the borehole/casing configuration. In other words, the measured Prox/Far capture ratio is "corrected," i.e., extrapolated to a value corresponding to open hole conditions.

Figure 11:
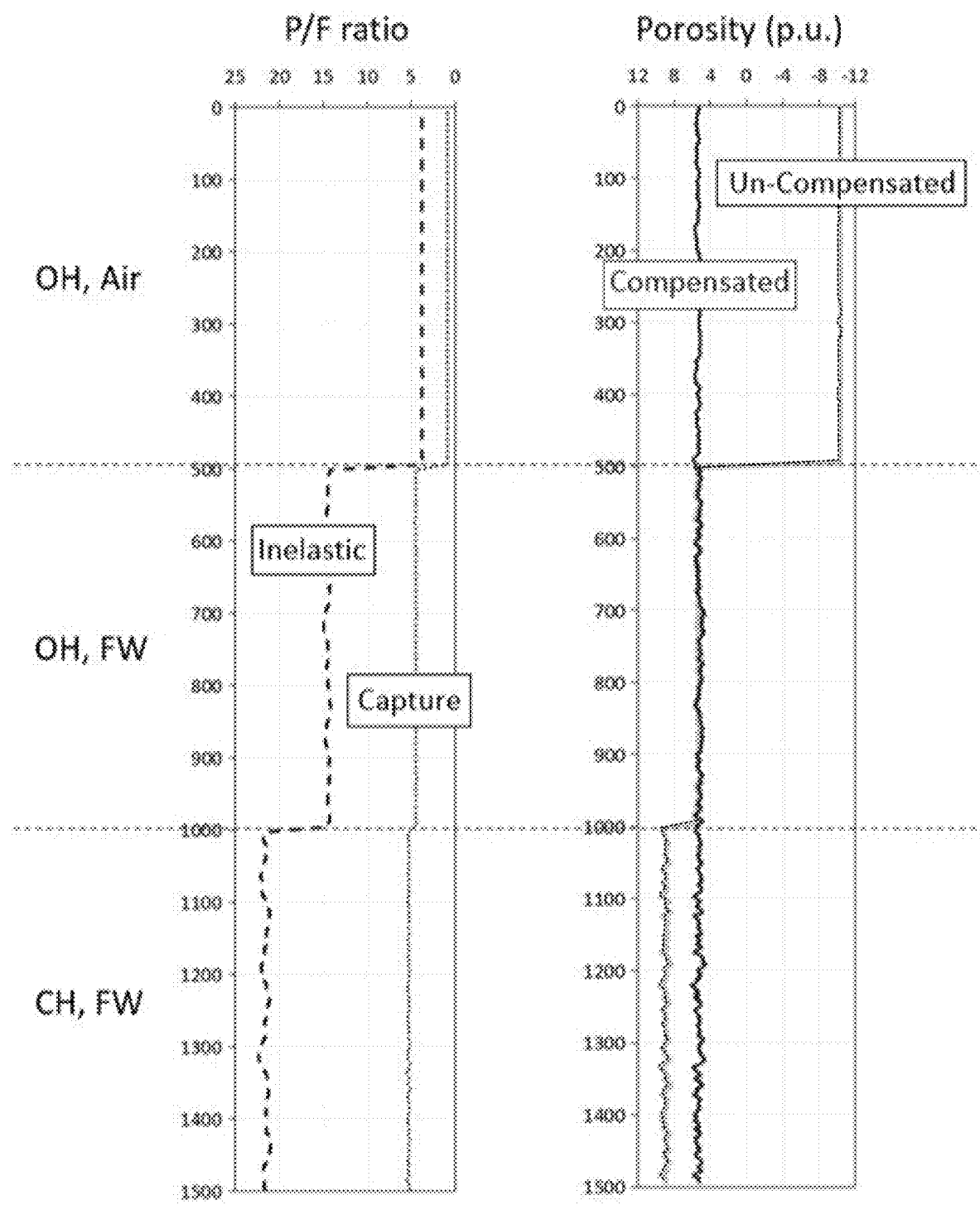
FIG. 11 shows a time log in a sandstone block for three different borehole environments: OH Air, OH FW, and CH FW.

FIG. 11 shows an example of how the correction function of FIG. 10 would be applied to a real log. This particular log is a time log of a sandstone block with three different borehole conditions: OH Air, OH FW, and CH FW. In the left track, the measured Prox/Far inelastic and capture ratios are shown by the dashed and dotted lines. On the right track, the uncompensated and compensated (i.e. uncorrected and corrected) porosities are shown by the gray/dotted and black lines. The uncorrected porosity varies greatly with the changing borehole conditions, but the corrected porosity holds a steady line, as it should for a block of fixed porosity.

Figure 12:
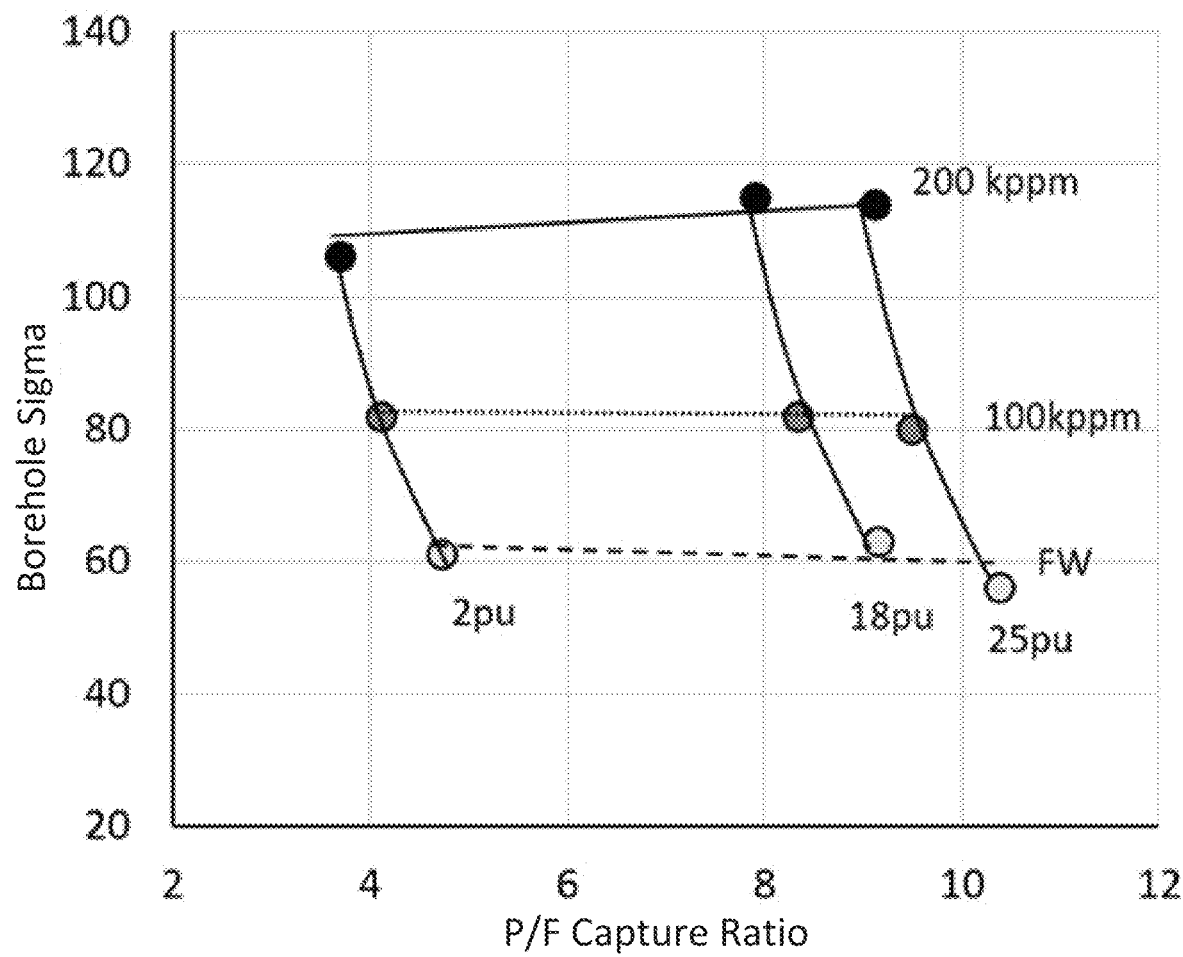
FIG. 12 shows MCNP simulated Prox/Far capture ratios plotted against the borehole sigma value a limestone formation.

The inventors have also discovered that borehole salinity can be compensated by plotting the borehole thermal neutron capture cross section (i.e., the borehole sigma value, expressed in "capture units") as a function of the P/F capture ratio, as shown in FIG. 12. The borehole sigma value can be determined from the borehole decay time constant $\tau_{BH}$ from the dual-exponential fit (Eq. 1) and calculated as Borehole Sigma=$4545/\tau_{BH}$. In this equation, $\tau_{BH}$ is in microseconds and the Borehole Sigma is in "capture units" (inverse decameters). Referring to FIG. 12, it can be seen that the borehole sigma is fairly independent of porosity, and only depends on the salinity of the borehole fluid as expressed in kppm. The P/F capture ratio, on the other hand, is seen to be dependent upon both the porosity and the salinity of the borehole fluid. As such, the salinity dependence of the P/F capture ratio can be removed by using the borehole sigma value.

In the same way that we used the P/F inelastic ratio in FIG. 9 to remove the borehole fluid density and casing effects from the P/F capture ratio, we can also use the borehole sigma value to remove the salinity effects. As shown in FIG. 12, the relationship between P/F capture ratio and borehole sigma, as expressed by the three curves, is approximately the same for each porosity—only a linear shift is involved. Thus, as was the case in FIG. 9 and FIG. 10, we can use the slope of the curve to give us a correction term to bring us back to FW OH conditions.

Some portions of the detailed description were presented in terms of processes, methods, programs and workflows. These processes, methods, programs and workflows are the means used by those skilled in the data processing arts to most effectively convey the substance of their work to others skilled in the art. A process or workflow is here, and generally, conceived to be a self-consistent sequence of steps (instructions) contained in memory and run using processing resources to achieve a desired result. The steps are those requiring physical manipulations of physical quantities. Usually, though not necessarily, these quantities take the form of electrical, magnetic or optical signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "receiving," "calculating," "determining," "displaying," or the like, refer to the action and processes of a computer system, or similar electronic computing device, that manipulates and transforms data represented as physical (electronic) quantities within the computer system memories or registers or other such information storage, transmission or display devices.

The present invention also relates to an apparatus for performing the operations herein. This apparatus may be specially constructed for the required purposes, or it may comprise a general-purpose computer, selectively activated or reconfigured by a computer program stored in the computer. Such a computer program may be stored in a non-transitory computer readable storage medium, which could be, but is not limited to, any type of disk including floppy disks, optical disks, CD-ROMs, an magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor, or may be architectures employing multiple processor designs for increased computing capability.

While the invention herein disclosed has been described in terms of specific embodiments and applications thereof, numerous modifications and variations could be made thereto by those skilled in the art without departing from the scope of the invention set forth in the claims.

What is claimed is:

1. A method of measuring a porosity of an earth formation traversed by a wellbore, the method comprising:
   receiving data generated by a logging tool, wherein the logging tool comprises:
      a neutron source configured to emit neutrons into the formation at an energy sufficient to induce inelastic scattering gamma rays and thermal capture gamma rays in the formation,
      a proximal gamma detector spaced a first axial distance from the neutron source, and
      a far gamma detector spaced a second axial distance from the neutron source, and
      wherein the data indicates gamma rays detected at the proximal gamma detector and gamma rays detected at the far gamma detector,
   from the data, determining a count of thermal capture gamma rays detected at the proximal gamma detector and a count of thermal capture gamma rays detected at the far gamma detector,
   determining a proximal-to-far thermal capture ratio as a ratio of the count of thermal capture gamma rays detected at the proximal gamma detector to the count of thermal capture gamma rays detected at the far gamma detector,
   determining a borehole thermal neutron capture cross section, and
   using the proximal-to-far thermal capture ratio and the borehole thermal neutron capture cross section to determine the porosity.

2. The method of claim 1, wherein determining the porosity comprises using the borehole thermal neutron capture cross section to compensate for borehole salinity.

3. The method of claim 1, wherein the data indicating the gamma rays detected at the proximal gamma detector and the gamma rays detected at the far gamma detector comprises, for each detector, a time spectrum comprising a burst interval indicating gamma ray counts detected while the neutron source is emitting neutrons and a decay interval indicating gamma ray counts detected while the neutron source is not emitting neutrons.

4. The method of claim 3, wherein determining the count of thermal capture gamma rays detected at the proximal gamma detector and the count of thermal capture gamma rays detected at the far gamma detector comprises, for each detector:
   determining a count of thermal capture gamma rays detected during the decay interval at that detector, and
   determining a count of thermal capture gamma rays detected during the burst interval at that detector.

5. The method of claim 4, wherein determining a count of thermal capture gamma rays detected during the decay interval comprises integrating the time spectrum over the decay interval.

6. The method of claim 4, wherein determining a count of thermal capture gamma rays detected during the burst interval comprises:
   fitting a decay function to the decay interval of the time spectrum,
   determining a borehole component and a formation component of the decay function over the decay interval,
   convolving the borehole component and the formation component of the decay function over the burst interval, and
   summing the convolved borehole component and the convolved formation component over the burst interval to determine the count of thermal capture gamma rays detected during the burst interval.

7. The method of claim 1, wherein determining the borehole thermal neutron capture cross section comprises:
   fitting a decay function to the decay interval of the time spectrum, and
   determining a borehole component and a formation component of the decay function over the decay interval.

8. The method of claim 7, wherein the decay function is a dual exponential function (DEF).

9. The method of claim 8, wherein the dual exponential function (DEF) is expressed as:

$$\mathrm{DEF}=A_{BH}*\exp(-t/\tau_{BH})+A_F*\exp(-t/\tau_F),$$

where $A_{BH}$ and $A_F$ are coefficients, t is time, $\tau_{BH}$ is a borehole decay constant, and $\tau_F$ is a formation decay constant.

10. The method of claim 9, wherein the borehole thermal neutron capture cross section is determined based on $\tau_{BH}$.

11. A system for measuring a porosity of an earth formation traversed by a wellbore, the system comprising:
   a logging tool comprising:
      a neutron source configured to emit neutrons into the formation at an energy sufficient to induce inelastic scattering gamma rays and thermal capture gamma rays in the formation,
      a proximal gamma detector spaced a first axial distance from the neutron source, and
      a far gamma detector spaced a second axial distance from the neutron source, and
   a computer configured to:
      receive data generated by the logging tool, wherein the data indicates gamma rays detected at the proximal gamma detector and gamma rays detected at the far gamma detector,
      from the data, determine a count of thermal capture gamma rays detected at the proximal gamma detector and a count of thermal capture gamma rays detected at the far gamma detector,
      determine a proximal-to-far thermal capture ratio as a ratio of the count of thermal capture gamma rays detected at the proximal gamma detector to the count of thermal capture gamma rays detected at the far gamma detector,
determine a borehole thermal neutron capture cross section, and
determine the porosity from the proximal-to-far thermal capture ratio and the borehole thermal neutron capture cross section.

12. The system of claim 11, wherein determining the porosity comprises using the borehole thermal neutron capture cross section to compensate for borehole salinity.

13. The system of claim 11, wherein the data indicating the gamma rays detected at the proximal gamma detector and the gamma rays detected at the far gamma detector comprises, for each detector, a time spectrum comprising a burst interval indicating gamma ray counts detected while the neutron source is emitting neutrons and a decay interval indicating gamma ray counts detected while the neutron source is not emitting neutrons.

14. The system of claim 13, wherein determining the count of thermal capture gamma rays detected at the proximal gamma detector and the count of thermal capture gamma rays detected at the far gamma detector comprises, for each detector:
determining a count of thermal capture gamma rays detected during the decay interval at that detector, and
determining a count of thermal capture gamma rays detected during the burst interval at that detector.

15. The system of claim 14, wherein determining a count of thermal capture gamma rays detected during the decay interval comprises integrating the time spectrum over the decay interval.

16. The system of claim 14, wherein determining a count of thermal capture gamma rays detected during the burst interval comprises:
fitting a decay function to the decay interval of the time spectrum,
determining a borehole component and a formation component of the decay function over the decay interval,
convolving the borehole component and the formation component of the decay function over the burst interval, and
summing the convolved borehole component and the convolved formation component over the burst interval to determine the count of thermal capture gamma rays detected during the burst interval.

17. The system of claim 11, wherein determining the borehole thermal neutron capture cross section comprises:
fitting a decay function to the decay interval of the time spectrum, and
determining a borehole component and a formation component of the decay function over the decay interval.

18. The system of claim 17, wherein the decay function is a dual exponential function (DEF).

19. The system of claim 18, wherein the dual exponential function (DEF) is expressed as:

$$DEF = A_{BH}*\exp(-t/\tau_{BH}) + A_F*\exp(-t/\tau_F),$$

where $A_{BH}$ and $A_F$ are coefficients, t is time, $\tau_{BH}$ is a borehole decay constant, and $\tau_F$ is a formation decay constant.

20. The system of claim 19, wherein the borehole thermal neutron capture cross section is determined based on $\tau_{BH}$.

* * * * *